United States Patent
Nair et al.

(10) Patent No.: US 8,719,263 B1
(45) Date of Patent: May 6, 2014

(54) SELECTIVE PERSISTENCE OF METADATA IN INFORMATION MANAGEMENT

(75) Inventors: Manoj Nair, Cary, NC (US); Stephen R. Perrin, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 309 days.

(21) Appl. No.: 11/864,783

(22) Filed: Sep. 28, 2007

(51) Int. Cl.
*G06F 7/00* (2006.01)
*G06F 17/30* (2006.01)

(52) U.S. Cl.
CPC .............................. *G06F 17/30607* (2013.01)
USPC .......................................................... 707/736

(58) Field of Classification Search
CPC .............................................. G06F 17/30598
USPC ....................................... 718/100; 707/1, 736
See application file for complete search history.

(56) References Cited

U.S. PATENT DOCUMENTS

| | | | |
|---|---|---|---|
| 6,718,358 B1* | 4/2004 | Bigus et al. | 718/100 |
| 7,117,453 B2* | 10/2006 | Drucker et al. | 715/833 |
| 7,610,285 B1* | 10/2009 | Zoellner et al. | 1/1 |
| 2003/0028503 A1* | 2/2003 | Giuffrida et al. | 707/1 |
| 2004/0243554 A1* | 12/2004 | Broder et al. | 707/3 |

* cited by examiner

*Primary Examiner* — James Trujillo
*Assistant Examiner* — Jeffrey Chang
(74) *Attorney, Agent, or Firm* — Workman Nydegger

(57) ABSTRACT

Persisting metadata in an information management system. During information management, metadata is collected and generated for objects in the computing environment. The metadata is used to classify the objects in order to provide certain services to the objects. The metadata is then selectively persisted to improve performance of the information management system in providing the services. Selectively persisting metadata can also reduce storage requirements.

20 Claims, 4 Drawing Sheets

SELECTIVE PERSISTENCE OF METADATA IN INFORMATION MANAGEMENT

CROSS-REFERENCE TO RELATED APPLICATIONS

Not Applicable.

BACKGROUND OF THE INVENTION

1. The Field of the Invention

The present invention relates to information management. More particularly, embodiments of the invention relate to systems and methods for the selective persistence of metadata in information management.

2. The Relevant Technology

As entities in general become more centered on electronic data, the ability to manage the electronic data becomes crucial for a wide variety of different reasons. Email is often used for communication, calendaring applications are maintained electronically, data is created and stored electronically, paper-based methods of doing business are being replaced with electronic methods. Because of the focus on electronic data, the amount of electronic data that is now generated by an entity can become quite large and therefore difficult to manage. In fact, many organizations today are unable to fully understand what their data is or what there data represents. Much of the electronic data maintained by an entity or organization often relates to different aspects of the entity and often is subject to various considerations. Some of the electronic data is of little or no value to the entity.

Often, the data's value to the entity is not readily know and the services required for the data is not necessarily known. For example, an entity may have a file storage system that it backs up on a regular basis. However, there may be many files on the file storage system that have little or no value to the entity. As a result, the entity is often paying for services that are not required. Further, there may be files that contain certain information that subjects those files to certain regulations. Because the content of those files is often unknown, the files are not receiving adequate services, thereby subjecting the entity to potential liability.

More generally, there are a number of different factors that may determine how certain data is handled or that determine the services that are needed for the data. Some of the factors or considerations include data security, data backup, data retention, data access control, regulatory compliance, corporate compliance, and the like or any combination thereof.

The ability of an entity to provide these services in an efficient manner is not solely dependent on the data itself. In fact, the data often includes metadata as well. The metadata can often provide some insight as to what the corresponding data is, identify other aspects of the data, and the like. However, conventional systems are unable to take advantage of this information in a meaningful way that enables the efficient implementation of management services. As a result, the value of the underlying data and/or metadata effectively remains unknown. Further, conventional systems may be performing functions (such as processing metadata) that consumes computing resources in an inefficient way. As previously mentioned, performance enhancements can provide great advantages in the realm of information management because of the processing involved. Conserving computing resources in one area can result in benefits in other areas.

The problem faced by information management systems is to find a way to use the data and the metadata in a manner that is efficient and that conserves both time and computing resources. There is therefore a need to provide more efficient information management services.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
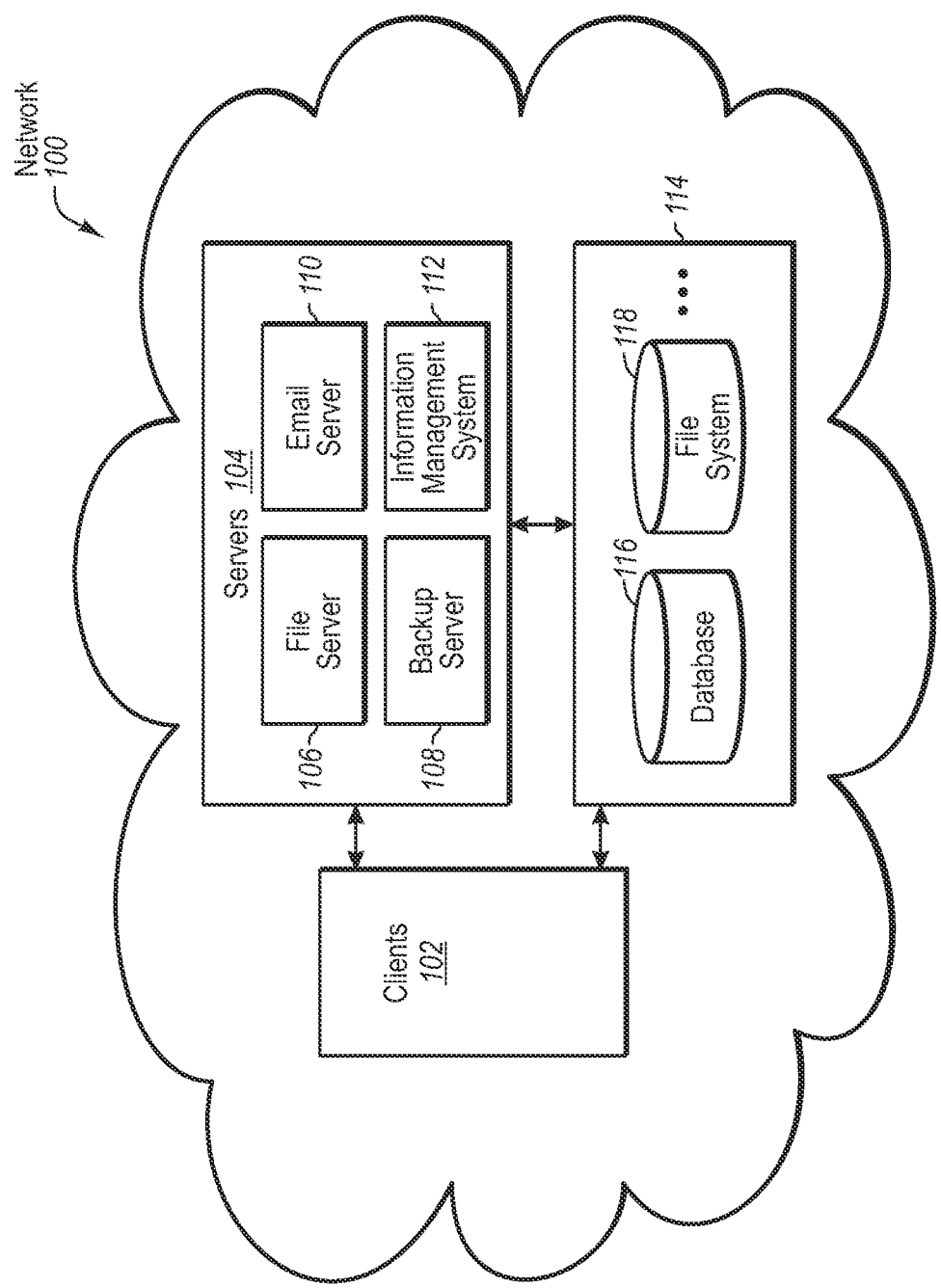
FIG. 1 illustrates an exemplary environment for implementing embodiments of the invention.

Embodiments of the invention relate to information or data management. Information management enables the orchestration of services such as data protection, data placement, corporate compliance, and others based on the value of the underlying data. Embodiments of the invention enable the data to be classified in an automated fashion and provides various levels of granularity that can be adjusted as needed. Further, data management in accordance with the present invention enables services to be provided to data regardless of where or how the data is stored. An entity can be assured that its data is receiving the services that are actually required.

Information management is scalable and can be implemented in a variety of different computer or computing systems. A computer system, by way of example only, may refer to a single computer, to multiple computers (including clients and/or server computers, and other devices) that are connected with a network. The objects of a computer system can include servers, applications, services, data, file, and the like or any combination thereof. It is understood that these terms can be used interchangeably where appropriate.

Embodiments of the invention relate to the metadata that used during information management. Information management can be made more efficient, scalable and efficient by considering how the metadata is used. Embodiments of the invention therefore relate to the generation of metadata, the accessing of metadata, and to the persistence of metadata. In fact, it has been discovered, surprisingly, that efficiencies can be obtained when certain metadata is not persisted. As described below, this information may be rediscovered over time, but the computing resources or processing time required to regenerate the metadata can be less that the computing resources or processing time required to consider that same metadata when making decisions in the information management context. Thus, embodiments of the invention selectively persist metadata for various reasons. Some of the reasons may be entity specific, while other reasons may be relevant to the information management system itself or to specific processes involved in providing information management to a computing system.

Implementing information management, including the persistence of metadata, in accordance with the present invention requires an understanding of the computer system or of servers operating on the computer system, services operating on the computer system, and of the data (files, information, emails, etc.) that exists in or is accessible by clients, servers, and services on the computer system. This knowledge can be obtained through discovery of the computer system, which provides the information management system with an understanding of the relationships that may exist between the various servers (and other devices) on the computer system and the data that is accessible over the computer system. The discovery of a computer system provides the information management with information that can be used to classify the computer system and the data in the computer system.

After the computer system (infrastructure and data) has been discovered, it is useful to classify the data that is in the computer system. Classification is a process that enables each object to be grouped with other objects or be examined in a manner that enables the needed services for that object or group of objects to be identified. For example, all objects that need a particular service may be grouped. Alternatively, embodiments of the invention enable each object to be categorized and classified individually. As a result, the service needs of each object are considered. Thus, the groupings identified herein are distinct from coarse groupings that fail to consider the service needs of the objects individually. An object can be any data (e.g., file), server, service, application or the like in the network.

Classification typically assigns each object to one or more categories. If available, information management enables each object to receive the services that each object requires. More common, service are typically provided in packages. As a result, the service level objects as identified by the assigned categories are often matched to the best available service package. Embodiments of the invention, however, are not so limited.

Once classification is complete, service level management is performed using the assigned categories. Service level management provides methods for modeling/mapping the results of discovery and classification to service levels. After service levels have been identified, the various services can be orchestrated and executed. Advantageously, the services can be carried out with respect to individual objects rather than on shares or drives. As a result, an entity may only pay for the services that are actually needed rather that pay for services that may not be needed. Further, unstructured data is categorized and can be provided with the services based on its value to the entity. In one embodiment, classification is a way for an entity to automatically place a value on the various objects of data. In one example, the creation of categories enables an entity to implement policies with respect to the underlying data and understand what the value of the data is or what the data represents. This can be achieved by constructing the logic that identifies or determines categories with these goals in mind. For example, a category may be created that identifies files having a particular type of sensitive information, such as social security numbers. When a file is assigned this category, the entity knows that certain precautions must be performed (e.g., encryption, or retention). Thus, service level management ensures that these files receive the appropriate services.

Once service levels are assigned and services are now ready to be provided or orchestrated, a decision can be made regarding the metadata. The decision of whether to maintain the metadata can be driven by either entity considerations or system considerations or any combination thereof. Other considerations are not precluded from this process. For example, an entity may desire to generate reports based on the content of files. An entity may desire to know what percent of files have sensitive information or may desire to know where files having sensitive content are physically stored. Because the metadata often includes this type of information, this report can be easily generated without having to conduct an analysis of the entire system. Files that have not been assigned to the "sensitive information" category can be excluded from the analysis. This conserves computing resources and reduces the time needed to generate the report.

Thus, report generation may be an example of an entity reason for retaining certain metadata. The system may also decide to retain information for files, by way of example only and not limitation, that have been indexed. In this case, discarding the metadata of an indexed file may unnecessarily result in the file being indexed a second time. This redundancy can be avoided by persisting the metadata. One of skill in the art, with the benefit of the present disclosure, can appreciate many reasons for why metadata may be retained. Further, the persisted metadata may also identify which versions of which files are already indexed. This could be less costly than asking the indexing server for every file. In the approach where the indexing server was asked, it would not be asked just for the files that were deemed to require indexing; it would also be asked for files that were deemed not to require indexing. The reason for this is that the file may have been indexed in a previous execution of the information management logic. And the rules for which files need indexing may subsequently have changed. This may have left files that should not be indexed according to the current rules but were indexed before in accordance to the old rules, and now need to be removed from the index.

Information management is also a process that can be ongoing. In most computer systems, objects are continually added and those objects typically require certain services. In addition to new objects, many objects also have a lifecycle associated with them. As a result, the status or need for services for certain objects can change over time. Information management incorporates lifecycle aspects such that data that grows old or stale can have the various services changed as needed.

Also, embodiments of the invention include reports, auditing, gap analysis, and the like to ensure that the services being provided are adequate. This protective ability ensures, for example, that a company complies with any applicable rule or regulation. The detection of a gap in service, for example, can lead to a change in service levels. In other examples, reports can be generated based on information made available by information management to implement corporate policies. The conservation of computing resources (e.g. storage, processor allocation) is an example of a corporate policy that can be effected by persisting metadata in the context of information management.

During the execution of information management, metadata is often collected about the objects in the computing system. This metadata often includes data that can be collected by a review of the file itself. Author, last time of access, file size, file location, access control, and the like are examples of data that can be collected and stored as metadata. In addition, information management may evaluate the content to collect additional metadata. In this case the file may be examined for certain words, phrases, and the like. The examination of the content can be conducted in different scope. One search can be for words or phrases associated with sensitive information (as defined by an entity, an agency, etc.) while another category can be looking for words in another area such as references to a standards committee.

In other instances, metadata may be generated from the file and/or the environment. This type of generated metadata may include a hash of the file, which may be used for identifying duplicate files. Metadata may also identify the types of services that an object receives (indexed, encrypted, etc.), identify the lifecycle stage of the file, and the like or any combination thereof. All of this information is typically stored and retained by the information management system as metadata.

As previously mentioned, however, there may be some number of files in a computing system that are not interesting for various reasons. Because it can be computationally expensive to process all of the metadata on a regular basis, embodiments of the invention relate to the selective persistence of metadata. This reduces the amount of metadata that needs to be processed and results in improved performance. In fact, it is often easier to discover (as discussed herein) a file and regenerate the metadata or a portion of the metadata repeatedly compared to persisting the metadata. Further, performance of a system can also be improved when a database is bulk loaded with information such as metadata compared to the time needed to update individual database records with new or unchanged metadata.

I. Exemplary Environment of a Computer System

FIG. 1 illustrates an exemplary environment for implementing embodiments of the invention. FIG. 1 is intended to illustrate that, while many systems often have similar functions, the actual implementation from one network to the next can vary significantly. The variability in network configurations is one of the aspects that have hindered conventional attempts at information management. The variability may be related, for example, to the type of software installed, the hardware selected for the network, the configuration of the hardware/software and the like. As previously described, this is one of the reasons that discovery of a computer system is not limited to the objects in the computer system but also includes discovery of the servers and services that are operating in the computer system. An understanding of the servers, applications, and services in a computer system can improve the ease and accuracy with which objects are classified.

In this example, the system 100 includes a network such as a local area network, a wide area network, and the like or any combination thereof. The connections in the system 100 can be wired and/or wireless. In this case, the computer system 100 typically includes clients 102 that have access to various servers 104 and to data 114. Various services and/or applications are typically provide by the servers 104 and, in some embodiments, access to some or all of the data 114 is controlled by the various servers 104. Some of the data 114 (e.g., backed up data) is not necessarily available to the clients 102. Some of the data 114 may also be remote.

Examples of the servers 104 may include a file server 106, an email server 110, a backup server 108, and an information management server 112 and the like or any combination thereof. Each of the servers 104 resides in or is accessible over the computer system 100. The data 114 may include file storage 118, a database 116, and the like. The file storage 118 and database 116 can be implemented in various ways using different software, different configurations, and the like. The hardware used to store the data 114 can include network attached storage (NAS) systems, and any other system known to one of skill in the art.

The data 114 can also be partitioned in different ways as well for different lines of business within the entity. For example, the data 114 may include a share for home directories, a shared area, an engineering share, and a marketing and sales share. Each share may be in its own domain to allow fine grain management by the respective line of business. One advantage of having different shares is that the corresponding files can be owned by different users.

One of skill in the art can appreciate that the clients 102, servers 104, and data 114 can be connected in a wide variety of configurations using various types of connections. Further, the software that operates on the servers 104, clients 102, and on the data 114 in some instances, may have certain properties or configurations. As previously discussed, it is this variability that can often complicate the ability to manage the information in a network.

II. Information Management in a Networked Environment

Information management according to embodiments of the invention has several components that work together to provide an understanding of the value of an entity's information. In some instances, the entity itself can provide or define some of the logic or rules that is used to classify or categorize the objects. Embodiments of the invention enable an entity to control some or all of the logic used for classification. Advantageously, this illustrates one way that embodiments of the invention enable an entity to better value its data. Objects can be classified or categorized individually using the entity's own logic. As a result, the service levels ultimately identified for that data reflect the entity's perception of the object's worth.

For example, an entity may want to retain objects that were authored by a particular person for a long time. A rule to that effect that is processed for the objects of the entity can then help classify the objects in an automated manner and the entity is assured that all objects that satisfy that requirement are receiving the appropriate services. More generally, an information management system can examine all business objectives for files, not just one at a time. For example, some of the files authored by a particular person may contain personal data on employees who have left the entity. Such files often fall under laws that require their destruction after a certain time period. Thus, some of the files authored by the person may need to be retained for a shorter length of time due to a more pressing consideration (regulations). One embodiment of information management can thus consider both the desire to retain files written by the author and consider regulations at the same time, for each object. Embodiments of information management can recognize conflicting service goals, as in this example, and then resolve the conflict. At the same time, some of the business objects may be additive. For instance, the entity may also desire to index all files written by the specific person.

Information management also reduces various risks (such as non-compliance) often associated with unstructured data. As described below, embodiments of the invention provide a system for classifying data such that the appropriate services can be provided to the entity's data. Embodiments of the invention also enables services that are required by an entity to be effectively identified and orchestrated. Examples of the services often required by entities includes backup services, retention services, corporate compliance services, regulatory compliance, data accessibility, data deletion, and the like or any combination thereof.

A. Discovery in Information Management

Figure 2:
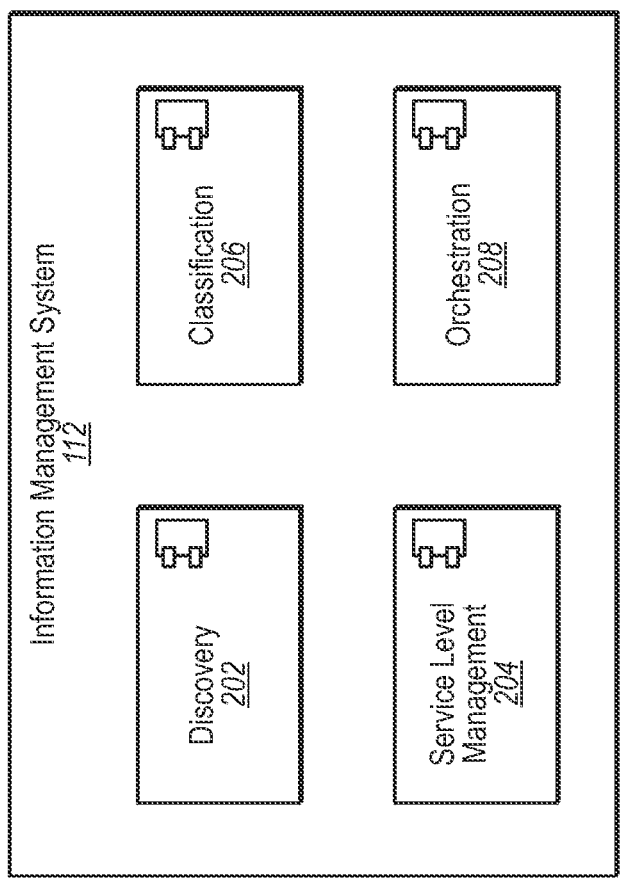
FIG. 2 illustrates one embodiment of a system and/or method for providing information management.

FIG. 2 is a flow diagram illustrating an exemplary system and method for information management of data including unstructured data files or objects. FIG. 2 provides a preliminary overview of information management, which is discussed in more detail with respect to FIGS. 3 through 5.

Discovery 202 is often the first element of information management. According to embodiments of the invention, discovery 202 includes both a discovery of the infrastructure and of the objects (data, files, etc.) in the network. The discovery process often includes the collection and or generation of metadata. The metadata may subsequently be stored in a repository for use by the information management system. The metadata may be used, by way of example only, for reports, service orchestration, and the like.

The discovery of the infrastructure, for example, can include a discovery of all IP devices on the computer system 100 that appear to act as a server. In to discovering these servers, discovery 202 includes discovering services as well. Thus, discovery 202 includes discovering the servers, services, and data residing in a network. Information management can also discover devices, servers, and/or applications that offer services, what kinds of service each offers, and what levels of service or capabilities are supported by that service provider.

The discovery of a computer system can be done in a variety of ways. The discovery of the infrastructure, for example, may involve an examination or analysis of all IP addresses existing in a network. Devices that act as a server can thus be identified. Once these servers are identified, additional information can then be sought from those servers. Applications can also be identified. For example, many entities often have a payroll application that includes a software program working in conjunction with a database. The database can be examined and may have certain table or logs when acting, for example, as source for payroll. The traffic on the network can also be decoded to examine headers to extract information that can characterize the network for the information management server. In this manner, the applications can be discovered. The discovery of an application can be used as additional input when categorizing the objects or data used by the payroll (or any other) application. For example, certain data or objects used by a payroll application may require special service levels that are not needed by other data or objects.

B. Classification in Information Management

Classification 206 is typically the next step in information management. Classification 206 is the process of collecting information about the data and/or of the infrastructure of a network and then identifying or associating the data or objects with categories. One result of classification is to associate objects being classified with certain categories. More particularly, the information collected during discovery 202 can be used during classification 206. The resulting categories assigned to objects in the computer system can be used in subsequent parts of information management as described below.

Classification 206, however, is not limited to the information collected during discovery. Classification 206 can also include, for example, applying sets of rules to the objects in a network. The rules can be default rules or rules that are selected according to a line of business of the entity or for any other reason. For example, objects that includes social security numbers may have to be retained for some period of time per governmental regulations. Alternatively, objects whose owner is a member of marketing may only be retained for a few years, but require full indexing.

In addition to applying rules to the objects of the entity, classification 206 also includes the generation of metadata as well as the use of existing metadata. Generated metadata may include values that are derived from an information objects rather than having been collected by the environment. For example, hash values can be generated and then used to identify duplicate objects. Another example of generated metadata is the case where the objects are examined for specified keywords and/or patterns. This generated metadata, or metadata derived from an object being analyzed, are useful during the classification process.

Existing metadata, on the other hand, can be collected from the objects or from the environment. For example, the owner, size, share, etc., of an object can be collected and used to automatically categorize an object. The collected metadata (such as file owner) can be used by rules to categorize the content of the object or the object itself. In some embodiments, a particular object may be associated with more than one category.

In another embodiment, aging considerations can be a consideration when classifying an object. On the other hand, aging considerations can be a component of service level mapping as discussed below. The aging characteristics or other lifecycle information of a particular object may also be used during the classification process. For example, an annual report is always an annual report. However, newer annual reports may require different services than older annual reports. This aging or lifecycle consideration can be part of classification and/or it can be considered during service level mapping.

During the initial process of classification, the metadata can be used for various reasons as categories are assigned to the various files. Often, metadata is used to assign categories. In one example, the rules used to assign categories can evaluate the metadata or other aspect of the objects to assign various categories. As previously stated, some of the rules may be entity specific, while other rules or logic may be performed for other reasons that are relevant to information management rather than to the policies or desires of the entity. Once the categories are assigned, and service levels are decided as discussed below, information management may decide to persist only a portion of the metadata. This process can be driven during the normal operation of information management.

C. Service Level Management in Information Management

After the objects have been categorized during classification 206, service level objectives can then be identified for the various objects. In one example, it is the process of identifying service level objectives that the policies of an entity can be implemented. The set of service level objectives assigned to each object may also drive the decision about how much descriptive information or metadata to persist for the object.

As previously stated, a category can be mapped through configuration data to one or more service level objectives. A category can also be mapped to a lifecycle, each of whose stages may have different service level objectives. There may be several categories involved in the analysis of a single information object, resulting in a variety of service level objectives or possibly conflicting service level objectives. Information management can also resolve conflicts, for example, using user supplied logic.

In other words, the classification process has already assigned categories to each of the objects. During the classification process, some of the various categories are assigned to each object as applicable. These categories can then be used to identify the service level objectives that may apply to the various objects. The discovery, for example, may have identified a particular object as an annual report and the classification of the annual report assigned a category of business critical. The information management system may be configured to map annual reports to lifecycle L1. If the object in question has aged enough to be in the second stage of that lifecycle, then a service level objective for that stage may dictate that the file needs to be retained for a specific period of time. Alternatively, the classification of the object may also indicate that the object should be retained for some specified period of time.

In this manner, the object that has been classified is then processed (using the assigned categories and/or lifecycle information) to identify the various service level objectives that should apply to the object. The service level objectives can then be bundled together into a target bundle that collectively represents the service level objectives that are desired for the object. Next, service level mapping includes matching the target bundle of services with service packages that are actually provided from service providers. If the service level objectives do not match or are not satisfied by the best matching actual service package, then a service gap is present.

The use of packages is often used by some entities that manage some or all of their services by restricting the offerings to a number of supported combinations of service levels. In other words, the particular combination of service level objects may not represent a supported package (also referred to herein as a service bundle). Embodiments of the invention contemplate logic that is used to find a suitable service package that is close enough to what the object needs. The information management system may be able to report that no existing service bundle or service package was sufficient.

D. Service Orchestration in Information Management

In information management, orchestration is the process by which the services are orchestrated. Orchestration can automate multiple service actions and translate and end user service level request to provider action. The workflow needed to execute the services are coordinated during orchestration.

III. Information Management

Figure 3:
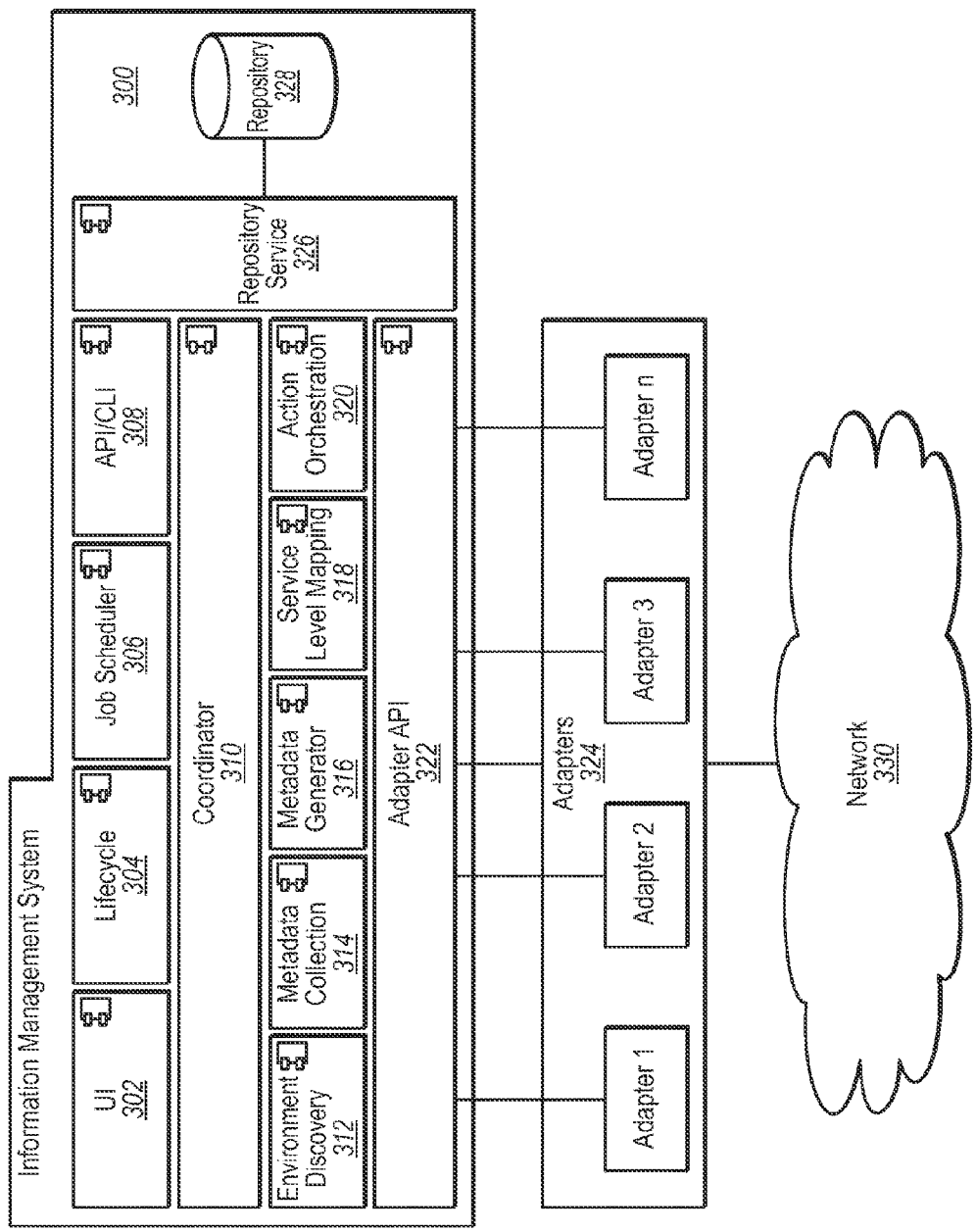
FIG. 3 illustrates an exemplary architecture for information management in a network environment.

FIG. 3 illustrates one embodiment of an architecture for information management. This embodiment of information management uses adapters to interface with a computer system. By using adapters, the information management system 300 provides scalability and adaptability as the computer system configuration changes over time.

In this example, the system 300 includes an adapter API 322 that interfaces with a plurality of adapters 324. The adapters 324 are used by the information management system 300 to interface with network. Information management 300 uses adapters 324 to discover the infrastructure of the network, to discover the objects (data, files, information, etc.) of the network, for classification of the data, and/or for action orchestration.

The adapters 324 can each be specifically prepared to enable the information management system 300 to interface and interact with various aspects of the network. For example, one adapter may enable the system 300 to discover IP devices on the network that are acting like servers. Another adapter may enable the system 300 to discover more information about specific types of network attached storage (NAS). Another adapter may enable the system 300 to examine or watch the network in order to discover applications. Adapters 324 can be used in metadata generation, by service orchestration to talk with various components about provided servers. Adapters 324 may also be used to deliver the services.

For example, if a particular NAS has its own adapter, that adapter can typically collect more information than what can be collected by a generic adapter. The specific adapter can take advantage of features in the NAS that are not necessarily available to other adapters. As more information is discovered or collected, the information management 300 can perform better classification, enable the data to be better evaluated, and assign more appropriate service level objectives. One of skill in the art can appreciate that many different adapters are possible. The adapters 324 can be used by each aspect of the system 300.

The system 300 includes an adapter manager 322 that provides an interface between the adapters 324 and the system 300. The adapter manager 322 can abstract the interface between the system 300 and the adapters 324 such that adapters can easily be accommodated by the system 300.

The discovery portion 312 of the system 300 uses the adapters 324 to discover the infrastructure and the other objects of the network 330. The discovery portion 312, for example, may use a particular adapter to discover information about a backup server. The discovery portion 312 may also use other adapters to discover the same backup server or to discover objects related to that back up server or within or used by that same backup server. All of the information collected through the adapters 324 can be combined or correlated.

After discovery (or during in some instances), classification is performed. In this embodiment, classification includes metadata collection 314 and metadata generation 316. The metadata collection 314 portion begins to collect metadata about the infrastructure and the objects. This can be performed, for example, by queries through the various adapters 324. Examples of metadata include size, owner, path, line of business, creation date, or any other information that can be collected using an adapter or information that may be provided about the data or device.

Metadata can also be generated during metadata generation 316. For example, metadata generation may use adapters to generate hash files, look for patterns or key works in objects, and the like. The generated metadata generates additional metadata that can be used to classify the data. In this example, the discovery of an object can cascade as additional information is discovered. For example, metadata generation often begins by looking at the metadata of an object to see if the object is worth further processing. Binary files, for example, may not include any data that is useful in the context of later rules. Thus, the rules may be ignored for certain objects. Next, hash rules may be applied, for example to look for duplicate objects. Metadata generation may also use computer information service rules to look for certain key words, patterns, etc., in an object. Classifier rules, can also be used during this process. For example, classifier rules tell how to assign categories to an object (an object with a social security number is categorized as a HIPPA file). Once generated, the assigned categories are another example of metadata. Often, the logic or rules used to classify or categorize an object are defined by the entity. Alternatively, the logic or rules of an entity can augment standard categorization rules. Finally, category assignment rules are executed that assign the data or objects to one or more categories.

Once the categories have been assigned to the various objects, the coordinator 310 can then initiate service level mapping 318. Service level mapping includes identifying service level objectives from the assigned categories of the objects. The desired services are then mapped to services that are actually available. For example, a service provider that offers backup, retention, and other services often offers service packages, but does not typically offer packages that specifically cover every potential need or variation of service. As a result, service level mapping is the process of identifying the best fit based on the service level objectives of an object and the offered service packages. One of skill in the art can appreciate that embodiments of the invention could identify the exact services required for each object, but may be limited by the services that are actually available. As a result, service level mapping includes the process of mapping the services level objectives to available services from the service providers. This process may also identify gaps in service. For example, none of the service packages available satisfy the service level requirements of an object, resulting in a service gap.

Next, the coordinator 310 provides or initiates action orchestration 320. Action orchestration 320 is the process by which the selected services in the service levels can be delivered. In one example, the action orchestration submits a proposal to orchestration adapters. The adapters report their ability to satisfy the proposal of the action orchestration 320 at specified locations. The action orchestration 320 then selects the best location and adapter set to satisfy the service requirements of the data. The actions are then performed.

In another embodiment, action orchestration 320 is not performed or is postponed. It is useful to identify what information management can achieve in a given computer system before actually performing or orchestrating the services. Thus, reports can be generated to provide a preview of what will be orchestrated.

The information management system includes a repository service 326 that has access to a database 326. In one embodiment, the database 328 is used to store infoobjects, which are objects used to record the processing state of data in the network and to record specific information. The infoobject can be persisted for state information and can support dynamic properties. For example, as new objects are discovered or additional classification information is found or accumulated, this information can be recorded and stored in the infoobject. For example, an infoobject may include the categories assigned for data particular object. These categories, as described above, can then be used for service level mapping.

As noted earlier, FIG. 3 provides an illustration of information management. However, there are some aspects of information management that may not be performed repeatedly. The discovery of the infrastructure, for example, happens less frequently because the environment changes less frequently. More frequently, objects such as files, emails, and other data may change more frequently. Files are created, modified, aged, and the like. As a result, the metadata of these objects can be reviewed regularly and the categories can be reevaluated over time. This enables an information management to adapt the services received by the objects of the computer environment as the objects change.

IV. Information Management and Metadata Persistence

As described herein, information management can deal with a large number of objects in a computing environment and there is value in persisting information (such as metadata) about these objects even though there is a corresponding cost in processing time and storage. For example, a given repository or computing environment may have millions of objects or files. However, there may be an even larger number of category assignment records because files are often assigned to multiple categories. This illustrates the amount of data that may be needed to implement information management. The selective persistence of metadata can provide a beneficial impact on computing requirements.

Persisting information such as metadata enables information management to perform several functions. Persisted information can be used for generating reports. Reports can be generated on several levels, such as a report on all the files, a report on files or specific files by department, based on content, and the like. Persisted information can also be used to support ad hoc searches. For instance an entity may be interested in identifying files containing sensitive information that are used in the last specified time period or owned by a particular user. Persisted information can also be used to store results that are needed for subsequent processing, but are difficult to obtain or calculate.

For example, the results of an analysis of a file for keywords and patterns that are indicative of sensitive information are worth saving for various reasons. First, the file can be skipped the next time the file is examined by an information management system as long as the file itself has not changed and as long as the rules for sensitive information have not changed. This example illustrates the savings in processing time that is achieved by persisting the metadata (results may be an example of generated metadata).

In another example, a file encrypted with a particular IRM policy is information that may be worth persisting. In this case, the next time that file is examined, a decision will likely be made to encrypt it. However, by persisting the information regarding the IRM policy, the information management can avoid interacting with the encryption server by noting in the persisted information that the file is already encrypted. Thus, checking the persisted metadata is typically better from at least a performance perspective.

Further, the amount of metadata that is persisted can vary. No metadata may be persisted for some files while other files may have only a portion of the metadata persisted or retained. Storing only the relevant information can conserve storage space as well as computing resources.

The selective persistence of metadata can be used in various aspects of information management. In one example, reports are often generated inline, at the time the files are examined. Thus, there is no need to retain certain metadata in this case. Ad hoc searches, in one embodiment are not necessarily generated in line but are designed to focus on categories that an entity or user has designated as relevant or important. For example, an entity can tag certain categories has being important. The metadata for files associated with these tagged categories can be persisted while the metadata for other files is not persisted. Also, there may be metadata that is retained for reasons related to information management and not necessarily to any tagging performed by an entity. For example, files with status information (results of content analysis, service levels applied, etc.) would be costly to rediscover if the information were not persisted.

Figure 4:
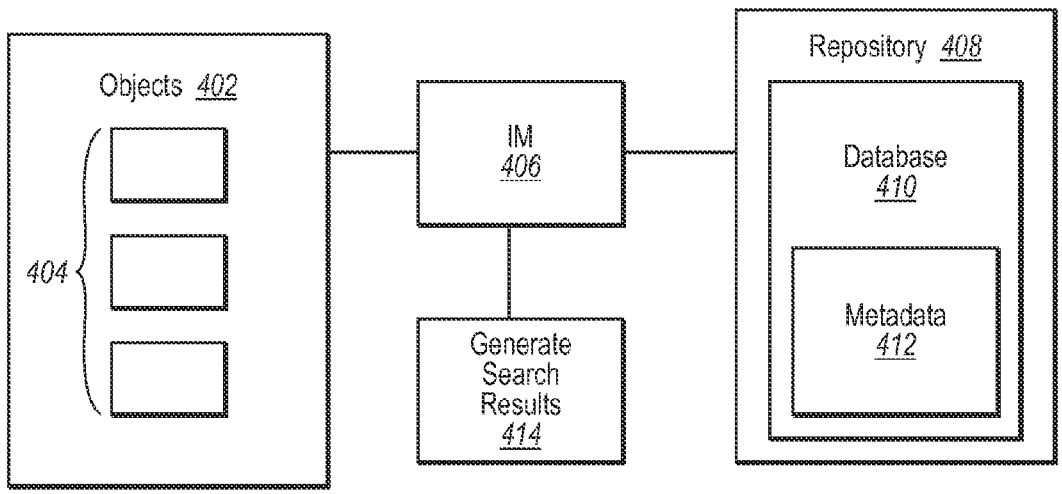
FIG. 4 illustrates an illustration of persisted metadata related to objects in a computing environment.

FIG. 3 illustrates an example of information management, which includes the collection and/or generation of metadata. FIG. 4 illustrates an example of persisting metadata. In FIG. 4, the information management (IM) 406 interacts with the objects 402. In this example, the objects 402 include files 404. During at least one of discovery, classification, service level management, and orchestration, metadata is generated and/or collected for the objects 402 including the files 404. The metadata is then selectively persisted as metadata 412 in a database 410, which may be located in a repository 408 or other storage.

In one example, the decisions regarding to the selection of service level objectives and service level management may be performed before the decision to retain metadata is made. This enables information management 406 to ensure that files whose metadata is not retained receive the appropriate services. Once this process is complete, the metadata to be persisted is retained in the database 410 while the remaining metadata can be discarded or deleted from the database 410.

The metadata 412, as previously described, can contain collected metadata and generated metadata. The decision of whether to maintain any of the metadata may be driven by the classification and service level management processes. For example, certain categories may be created that reflect a policy of the entity and it may be useful to retain the metadata for objects in this category. For example, a category designated "violations" may be created. Files that qualify for this category may include mp3 files or other data that is downloaded from a network. Retaining this metadata enables the entity to target these files for deletion or for other action. At the same time, information management can also target files for deletion or other action regardless of whether the corresponding metadata is retained. However, metadata that is not retained may impact the ability to support queries that generate lists of individual files.

During the ongoing process of information management, files whose metadata was not persisted can be discovered again and have the associated metadata bulk loaded into the database 410. However, this typically happens when the associated files have changed or some of the other logic has changed such that these files have metadata that is worth persisting. For example, a particular file may now require indexing or the file may have been altered to include sensitive information. These changes may make it useful to persist the associated metadata. The appropriate service levels can again be either confirmed or updated as needed before the metadata 412 is again selectively persisted. Alternatively, the metadata may not be uploaded into the database 410 because it was not deemed worth persisting the last time. If nothing has changed, the metadata is unlikely to be persisted and is therefore not uploaded.

Figure 5:
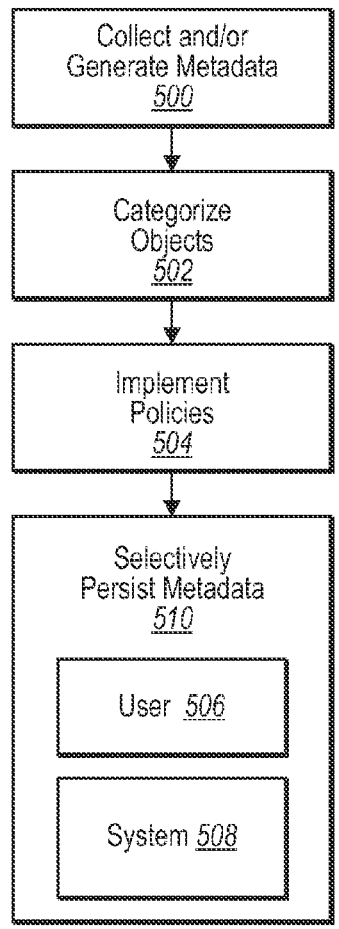
FIG. 5 illustrates an embodiment of a method for persisting metadata.

FIG. 5 illustrates a method for determining whether to retain metadata. As previously mentioned, this decision can have an impact on performance. Be reducing the amount of metadata that is persisted, the load on the computing resources can be reduced when the metadata is analyzed or processed. Also, it may be less taxing, in some examples, to upload metadata in bulk compared to updating individual records in the metadata database. In other words, it is often less expensive computational to regenerate or rediscover the objects whose metadata was not persisted.

FIG. 5 begins by categorizing objects 502 in a computing system, although examples of the invention can be started from other states or stages of information management. In one example, the process may begin by collecting and/or generating metadata 500. The metadata is then kept in memory long enough to support all of the information management processes for the file and then a decision is made regarding whether to persist the metadata. If it is to be persisted, the metadata may be uploaded in bulk for those files that do not have existing metadata in the metadata database and then updating metadata for objects whose metadata already exists in the metadata database.

Generally, the categorization of objects or data in a computing environment includes the application of logic to various aspects of the objects. It may include an analysis of the object's content, require the generation of additional metadata, and the like.

Once the objects have been assigned categories, and a file can be assigned to more than one category, information management can implement policies 504. These policies can serve multiple purposes. For instance, mapping the categories to service level objectives or to service level management bundles. Further, these policies can also be used to identify files or objects whose metadata is persisted. For example, files having a particular category or combination of categories may be flagged such that the metadata is persisted or may be mapped to a service that persists the metadata. The metadata of objects that are not identified or are otherwise excluded from these categories is not persisted or is deleted from the metadata database.

More particularly, once the metadata is generated and categorized, the polices are implemented, often using the information management methods already disclosed herein. Thus, the policies can be implemented in mapping categories to services and/or in the construction of category assignment. Policies can also be implemented based on content of the metadata itself in combination with system requirements. For example, information management maintains metadata to insure that files are not repetitively indexed, or searched for specific content repeatedly (unless the file has changed, for example).

Once the policies have been implemented, the metadata is selectively persisted 510. Motivation for persisting metadata can be from the perspective of a user 506 (such as an entity) or from the perspective of a system 508 such as information management. The user aspects may relate to data that the user has tagged or categorized as being relevant to a business purpose or for other purpose. The system aspect may relate to the status, such as knowing when the status of the current object is costly to recover. This may include discarding metadata for certain objects, updating certain metadata in the database, and the like.

Selectively persisting metadata can be accomplished in various ways. For example, some of the categories have been tagged during the information management process. Tagging categories is often based on logic that has been generated in view of the criteria set forth by a user or by an entity. For example, a user may have logic created that is designed to detect whether a file contains certain information, such as a social security number. This category is tagged such that metadata for files that have been assigned to this category is persisted or retained. In one example, a tagged category is one way to set a threshold that, when satisfied, requires the metadata of associated files or objects to be persisted.

The threshold can be met or considered in other ways as well. For example, some objects will not be assigned to any categories. The threshold is thus not satisfied and the corresponding metadata is not persisted. In another example, the threshold may require a particular combination of categories. In this case, the metadata of an object that is assigned a tagged category may not be retained. One of skill in the art, with the benefit of the present disclosure, can appreciate that selectively persisting the metadata can be achieved in various combinations of tagged categories, logic, service level assignment, and the like.

With reference back to FIG. 4, the persisted metadata 412 can then be used to generate reports and/or to generate search results. As previously described, reports are often generated as a part of information management. However, the reports are typically based on all of the files while the descriptions of those files are still in the memory or available to the information management system. This has the benefit of generating complete reports. Once the metadata or a portion of the metadata is persisted, reports can still be generated, but they are usually based on categories that have been tagged by the user or by the entity. The persistence of metadata may enable lists of files to be identified from existing metadata, but this type of a search result is distinct from a report that is based on all of the data as previously described. For example, the metadata of certain objects that violated a corporate policy (such as a prohibition of downloading music files) is retained when this policy is implemented as described in FIG. 5 or when the associated category is tagged such that the corresponding metadata is persisted. Then, a search result can be generated that identifies these files and the appropriate action (such as file deletion) can be taken. This has the advantage of conserving space.

As a result and because of the flexibility afforded by information management, a wide variety of policies can be implemented and metadata can be selectively persisted. Further, as policies change, it is an easy task to reformulate the classification process to regenerate the needed metadata.

Information management enhances the ability of a system to manage its unstructured data across domains or enhances the ability of users to manage their data including unstructured data, across varying lines of business, and by identifying services that best meet the system's or entity's requirements. As discussed above, management of service levels on information requires knowledge of the servers and systems that provide services for the information. Discovery includes the automated acquisition of this knowledge by discovering and applying classification techniques to the environment objects (servers and systems).

In addition to simply discovering and classifying the data of a network embodiments of the invention can cascade the discovery. Cascaded discovery and/or cascaded classification gathering increasingly detailed descriptions of environment data (including infrastructure, applications, services, and content) by using the results from each stage of discovery to drive the next stage. For example when an object is found to be a file server it is probed to see if it is a particular type of file server (among other choices). And if it turns out to be that type of file server, then a specific probe or adapter (including a plugin) will be used to discover firmware version and other configuration information unique to that type of file server.

Once basic information about an object is discovered it can be used to drive further levels of discovery. For example the file type, owner, location etc. can be used to decide whether to analyze the content of the file (e.g., metadata generation), which will yield more information to be used in the information management process.

As previously mentioned, grades of service offered by the environment servers are usually measured in different terms from the descriptions of services required for information. Embodiments of the invention relate further to the application of abstraction to both systems so that they can be compared and matched in a common language. This facilitates the ability of a network to more easily identify the services that are actually provided.

In a single installation the service providers are usually managed in a single uniform system for identifying service levels and relating them to environment data or objects. But the information owners are unlikely to be so uniform. Various groups (lines of business) may have very different systems for determining the business importance of information and the service levels their information needs. Embodiments of the invention provide the ability to recognize independent groupings (domains) of information owners, each of which can configure separate logic for classification and service mapping even though the service options (list of available service levels) are common to all groupings. Furthermore some of the relevant classification and service mapping logic may be common to all domains. For example when the corporate compliance officer decides how to identify files that are subject to HIPAA, the identification logic and recommended service levels should be applied to all files regardless of owner.

Service level mapping is a precise way for configuration data to guide the determination of service levels required for an information object, starting from the categories assigned to the object. This aspect of the invention describes mappings with priorities, lifecycle stages, and user-selectable strategies for selecting appropriate service bundles.

Auction based services covers the idea of realizing the service levels needed for an information object by engaging a set of relevant service providers and having each offer to solve some or part of the problem. In this case, the plans for addressing one service may impact the right strategy for addressing a second service.

One aspect of orchestration enables users or customers to perform searches by indexing the data. However, building indexes can consume significant resources. Advantageously, information management allows the user to use the concepts (discovery, classification, service mapping) described herein to select which information gets indexed. Information management enables indexing to be provided as a service and the service is selected according to the output of the service level mapping.

Conventionally, information management treats each service as a one-dimensional concept, often a simple list of service levels. Embodiments of the invention provide some service areas that are multi-dimensional: several independent decisions must be made to determine the service level needs of each information object. In effect some service areas are groupings of other subordinate service areas.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for providing information management for objects in a computer system, the method comprising:
classifying objects in a computing system using at least metadata associated with the objects to assign at least one category to each of the objects, wherein the objects include at least data stored in the computer system, wherein the metadata includes both existing metadata that is collected from the objects, as well as generated metadata that is generated from the objects in the computer system, wherein classifying objects includes:
applying rules to the objects to produce the generated metadata; and
assigning one or more categories to each of the objects based at least on the collected existing metadata, and on the generated metadata;
determining service level objectives for each of the objects based on the categories assigned to each of the objects;
tagging one or more categories based on logic generated in view of criteria set forth by a user or an entity;
identifying specific objects that are associated with the tagged categories;
persisting metadata for the specific objects associated with the tagged categories in a metadata database, wherein the persisted metadata includes at least some of the generated metadata that is generated from the objects associated with the particular category;
discarding metadata from the metadata database for at least some of the objects that are not associated with the tagged categories; and
providing services to each of the objects based on each object's service level objectives.

2. The method of claim 1, further comprising collecting metadata for the objects in the computing system.

3. The method of claim 2, further comprising generating additional metadata for the objects in the computing system.

4. The method of claim 3, further comprising uploading at least a portion of the metadata to a metadata database.

5. The method of claim 4, wherein uploading at least a portion of the metadata further comprises selectively uploading metadata for objects that are not currently associated with existing metadata in the metadata database and selectively updating the existing metadata for objects that are currently associated with metadata stored in the metadata database.

6. The method of claim 1, further wherein determining service level objectives includes mapping each of the objects to service level objectives individually based on the assigned categories.

7. The method of claim 1, wherein persisting metadata for the specific objects further comprises deleting metadata associated with other objects from the metadata database when the other objects have changed such that the metadata no longer needs to be persisted.

8. The method of claim 1, further comprising periodically rediscovering objects whose metadata was not persisted, including identifying service levels currently applied to the objects, wherein metadata for the rediscovered objects is regenerated.

9. The method of claim 1, further comprising discovering an infrastructure of the computer system and one or more objects in the computer system.

10. The method of claim 6, wherein mapping the objects to service level objectives based on the assigned categories further comprises implementing policies of an entity or of an information management system.

11. A method for providing information management for objects in a computing environment, the method comprising:
collecting metadata from objects in a computing system;
generating additional metadata from the objects by applying at least rules to the objects, wherein the additional metadata is included in the collected metadata;
analyzing the metadata associated with the objects in the computing system;
assigning categories to the objects based on the analysis of the metadata, wherein the objects include at least data stored in the computing system;
determining service level objectives for each of the objects based on the assigned categories of each of the objects and based on a lifecycle of each object;
tagging one or more of the categories based on logic of an entity;
selectively persisting the metadata for the specific objects in a metadata database based on the tagged one or more categories;
deleting metadata associated with objects that are not included in the tagged one or more categories from the metadata database such that the metadata of the objects that are not included in the tagged one or more categories is not persisted in the metadata database; and
providing services to each of the objects based on each object's service level objectives.

12. The method of claim 11, further comprising generating reports based on the metadata prior to selectively persisting the metadata.

13. The method of claim 11, wherein selectively persisting the metadata further comprises persisting metadata for each of the specific objects that is assigned to the one or more categories, wherein the one or more categories have triggered a threshold for metadata persistence.

14. The method of claim 13, further comprising persisting metadata for objects having status information in their metadata.

15. The method of claim 14, wherein the status information includes one or more of indexing information, and encryption information.

16. The method of claim 11, further comprising conducting a search of the metadata to identify a list of objects.

17. The method of claim 11, further comprising rediscovering objects whose metadata was not persisted, wherein the rediscovered metadata is persisted in the metadata database if the rediscovered objects have changed such that the associated objects are tagged or have status information.

18. The method of claim 11, further comprising generating reports inline before selectively persisting the metadata and generating search results from the persisted metadata.

19. The method of claim 11, wherein some of the objects are assigned no categories such that metadata for objects that are not assigned to any of the categories is not persisted.

20. The method of claim 11, wherein selectively persisting metadata further comprises persisting metadata for objects that are assigned at least one category that has been identified by the entity for metadata persistence and discarding metadata for objects that are not assigned to any categories.

* * * * *